(12) United States Patent
Park et al.

(10) Patent No.: US 9,346,455 B2
(45) Date of Patent: May 24, 2016

(54) CONTROL METHOD FOR A TRANSMISSION IN A VEHICLE

(71) Applicants: Hyundai Motor Company, Seoul (KR); Kia Motors Corporation, Seoul (KR)

(72) Inventors: Sung Ho Park, Whasung-Si (KR); Hyung Bin Park, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 167 days.

(21) Appl. No.: 14/102,227

(22) Filed: Dec. 10, 2013

(65) Prior Publication Data

US 2015/0066318 A1  Mar. 5, 2015

(30) Foreign Application Priority Data

Sep. 4, 2013  (KR) .................. 10-2013-0106299

(51) Int. Cl.
| | |
|---|---|
| *G06F 17/00* | (2006.01) |
| *B60W 10/11* | (2012.01) |
| *B60W 10/06* | (2006.01) |
| *F16H 61/04* | (2006.01) |
| *F16H 63/50* | (2006.01) |

(52) U.S. Cl.
CPC ............... *B60W 10/11* (2013.01); *B60W 10/06* (2013.01); *F16H 61/0403* (2013.01); *F16H 63/50* (2013.01); *F16H 2061/0414* (2013.01)

(58) Field of Classification Search
CPC ........ B60W 10/11; B60W 10/06; F16H 61/00
USPC .......................................................... 701/54
See application file for complete search history.

(56) References Cited

U.S. PATENT DOCUMENTS

| | | | |
|---|---|---|---|
| 5,568,387 A | 10/1996 | Andersson | |
| 5,655,407 A | 8/1997 | Dresden, III et al. | |
| 6,931,315 B2 * | 8/2005 | Ayabe | B60W 10/06 477/118 |
| 7,967,726 B2 * | 6/2011 | Kim | F16H 61/143 477/107 |
| 2003/0033068 A1 * | 2/2003 | Kawai | B60H 1/3222 701/54 |
| 2003/0109359 A1 * | 6/2003 | Eguchi | B60K 6/485 477/174 |
| 2004/0214687 A1 * | 10/2004 | Morisawa | B60W 10/06 477/109 |
| 2005/0245351 A1 * | 11/2005 | Yamada | B60W 10/06 477/110 |
| 2010/0217489 A1 * | 8/2010 | Turski | F02D 41/28 701/48 |
| 2011/0021312 A1 * | 1/2011 | Fukitani | B60K 6/48 477/5 |
| 2013/0237372 A1 * | 9/2013 | Ueki | F02D 29/02 477/86 |
| 2014/0019021 A1 * | 1/2014 | Yanagida | B60W 10/02 701/54 |

FOREIGN PATENT DOCUMENTS

| | | |
|---|---|---|
| JP | 10-331650 A | 12/1998 |
| JP | 11-105582 A | 4/1999 |

(Continued)

*Primary Examiner* — David J Hlavka
(74) *Attorney, Agent, or Firm* — Morgan, Lewis & Bockius LLP

(57) ABSTRACT

A control method for a vehicle transmission includes, in a TCU, receiving the rpm of an engine from an rpm sensor and determining whether to perform shifting of gears depending on the received rpm, when the shifting of gears is determined, allowing the TCU to control an ECU to cut off fuel supplied to the engine combustion chamber and to release a clutch connecting the engine and the transmission, after the control action is performed, monitoring a change in pressure of engine cylinders and allowing engine braking action to be activated, and when the rpm is reduced to a predefined value or less after the engine braking action, performing a shifting action.

6 Claims, 3 Drawing Sheets

(56) References Cited

FOREIGN PATENT DOCUMENTS

| | | | |
|---|---|---|---|
| JP | 2004-108495 | A | 4/2004 |
| JP | 2005-104415 | A | 4/2005 |
| JP | 3753042 | B2 | 3/2006 |
| KR | 2000-0035464 | A | 6/2000 |
| KR | 10-0314604 | B1 | 12/2001 |

\* cited by examiner

Shift time (engine brake off)

Shift time (engine brake on)

CONTROL METHOD FOR A TRANSMISSION IN A VEHICLE

CROSS-REFERENCE TO RELATED APPLICATION

The present application claims priority of Korean Patent Application Number 10-2013-0106299 filed Sep. 4, 2013, the entire contents of which application is incorporated herein for all purposes by this reference.

BACKGROUND OF INVENTION

1. Field of Invention

The present invention relates, in general, to a method of controlling the shifting of gears, i.e. shift stages, in a transmission, particularly an automatic transmission, for a vehicle.

2. Description of Related Art

Generally, transmissions, particularly automatic transmissions for vehicles perform a shift action when the rpm of an engine reaches a synchronous state. Particularly, in case of an automated transmission (ATM) used in a conventional vehicle, it takes much time to reach a top speed after starting, because the automatic shift of gears consumes much time.

For example, Japanese Unexamined Patent Publication No. 1999-105582 A discloses a shift control device for an automatic transmission, which rapidly reduces the rpm of an engine at least when a shift-up action occurs, thereby restricting both shift shock and noise.

However, such a structure and thus a control method therefor are complicated, so there is a need for a control method for a vehicle transmission in which shift time is made shorter and the structure thereof is simpler.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, the present invention has been made keeping in mind the above problems occurring in the related art, and the present invention is intended to propose a control method for a transmission in a vehicle in which shift time is made shorter and the structure thereof is simpler.

Various aspects of the present invention provide for a control method for a transmission in a vehicle, the method including: a shift-determination stage of, in a transmission control unit (TCU), receiving the rpm of an engine from an rpm sensor and determining whether to perform shifting of gears depending on the received rpm; an engine control unit (ECU)-control stage of, when the shifting of gears is determined in the shift-determination stage, allowing the TCU to control an ECU to cut off fuel supplied to a combustion chamber and to release a clutch connecting an engine and a transmission; an engine-braking stage of, after the control action in the ECU-control stage, monitoring a change in pressure of engine cylinders and allowing engine braking action to be activated; and a shift-stage of, when the rpm is reduced to a predefined value or less after the engine-braking stage, performing shift action.

The rpm sensor may be provided in the transmission.

The shift-determination stage may include comparing the rpm received from the rpm sensor with a reference rpm at the shift of gear which is stored in the TCU, and, when the received rpm is equal to or higher than the reference rpm, performing the shift action in a subsequent stage.

The engine-braking stage may include monitoring the change in pressure in the engine cylinders and activating the engine braking action on the engine cylinder that changes in pressure during a compression stroke.

The engine braking action may be sequentially and repeatedly performed on the plurality of engine cylinders such that a reduction in rpm required for the shifting of gears is obtained.

The method may further include an engine-brake release stage of, after the shift action in the shift stage, in the TCU, controlling the ECU to release the engine braking action.

According to the control method for a transmission in a vehicle, when the shifting of gears is carried out, a reduction in rpm of an engine is obtained faster than in the related art without using separate parts, shortening the time from the start to reach top speed, thereby improving accelerating performance that a driver can feel and thus increasing a performance quality of a transmission.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
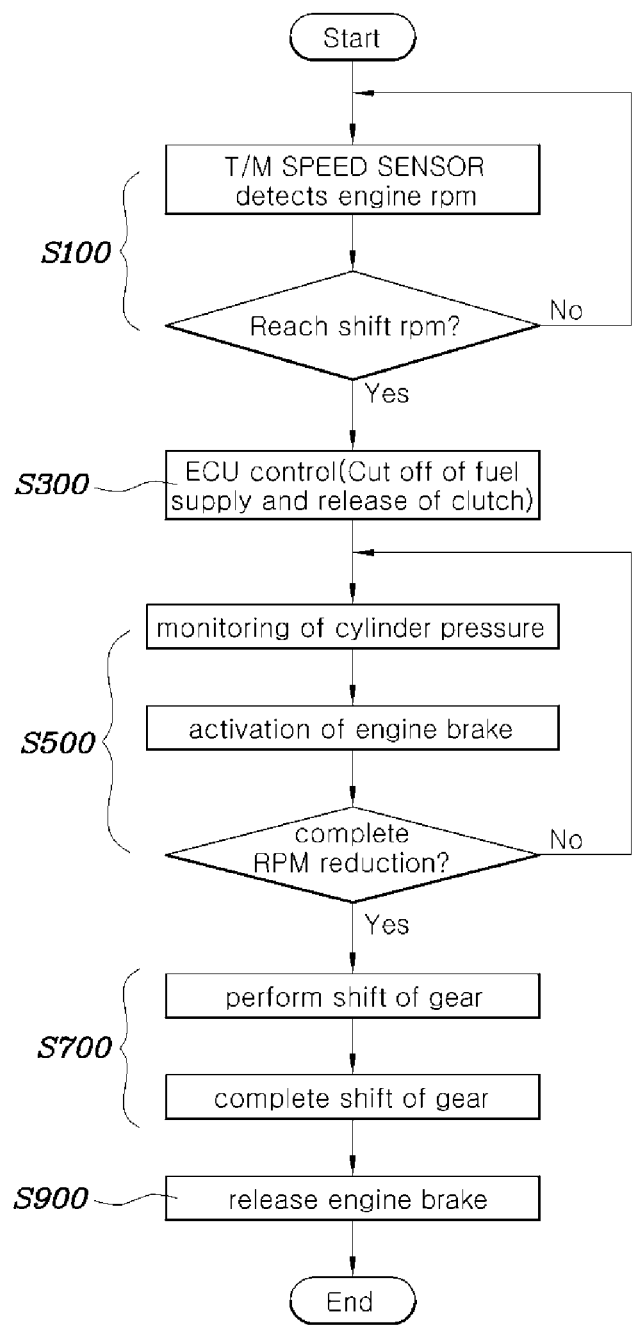
FIG. 1 is a flow chart showing a procedure of an exemplary control method for a transmission in a vehicle according to the present invention.

FIG. 1 is a flow chart showing a procedure of a control method for a transmission in a vehicle according to various embodiments of the present invention.

The control method for a transmission in a vehicle includes: a shift-determination stage (S100) of, in a transmission control unit (TCU), receiving the rpm of an engine from an rpm sensor and determining whether to perform shifting of gears depending on the received rpm; an ECU-control stage (S300) of, when the shifting of gears is determined in the shift-determination stage (S100), allowing the TCU to control an engine control unit (ECU) to cut off fuel supplied to the engine combustion chamber and to release a clutch connecting the engine and the transmission; an engine-braking stage (S500) of, after the control action in the ECU-control stage (S300), monitoring a change in pressure of engine cylinders and allowing engine braking action to be activated; and a shift-stage (S700) of, when the rpm is reduced to a predefined value or less after the engine-braking stage (S500), performing shift action.

The shifting of gears in an automated transmission (AMT) can be carried out in such a manner that, when the rpm of an engine reaches a predetermined rpm, the shifting of gears to the next range is conducted after the rpm of the engine is reduced to a certain level with a cut-off of the supply of fuel. That is to say, in order to perform the shifting of gears, the rpm of an engine should be reduced to a certain level or less even while the rpm is increasing. Here, since the time required for the shift is determined depending on the time taken to reduce the rpm of an engine to the certain level or less, it is important to quickly reduce the rpm of an engine.

According to the present invention, in addition to a conventional method of reducing the rpm of an engine, an engine brake is adapted to reduce the rpm of an engine more quickly. Here, the engine brake is a kind of auxiliary brake in which an exhaust valve on a combustion chamber is previously opened before a piston of an engine reaches top dead center on the compression stroke, so that compressed air in the cylinder is discharged as exhaust gas, thereby reducing the rpm of the engine.

In the control method, while a vehicle is traveling, the TCU continuously receives the rpm of an engine from an rpm sensor, and determines whether to perform the shifting of gears depending on the received rpm (S100).

In the shift-determination stage (S100), an rpm sensor (e.g. a transmission rpm sensor) is provided on a transmission so as to detect the rpm of an engine or a transmission and then sends the detected rpm to the TCU. Here, the position of the sensor and an object (e.g. an engine or a transmission) of the sensor for which the rpm is detected can be changed according to the design of a transmission system and the environment of a vehicle, so the present invention is not limited to the foregoing configuration.

The shift-determination stage (S100) may include comparing the rpm received from the rpm sensor with a reference rpm at the shifting of gears which is stored in the TCU, and, when the received rpm is equal to or higher than the reference rpm, performing the shift action (S300) in a subsequent stage (the ECU-control stage).

In the ECU-control stage (S300), when the shifting of gears is determined in the shift-determination stage (S100), the TCU controls the ECU to cut off fuel supplied to the engine combustion chamber and to release the clutch connecting the engine and the transmission. That is to say, in the current state, fuel supplied to the engine is cut off in order to prevent the rpm of the engine from further increasing, and then the clutch operatively engaging the engine and the transmission is released so as to prevent power of the engine from being transmitted to the transmission.

In the ECU-control stage (S300), the rpm of an engine is not input to the transmission according to a command input to the ECU. Then, in order to reduce the rpm of an engine, the engine brake is actuated. To this end, an engine-braking stage (S500) is performed which includes monitoring the change in pressure in the engine cylinders and activating the engine braking action on the engine cylinder that changes in pressure during a compression stroke.

The reason of monitoring the pressure of the cylinders is because the engine brake is activated to reduce the rpm of an engine with application of load to the engine. That is, as described before, the engine brake reduces engine power with action in which an exhaust valve is previously opened before a piston of an engine reaches top dead center on the compression stroke, thereby restricting a normal compression stroke from occurring. The ECU activates the engine brake by opening the exhaust valve with respect to a cylinder that proceeds toward explosion stroke from the compression stroke.

Since all or a portion of the cylinders in an engine can be used according to an amount of the rpm of the engine to be reduced depending on the number of ranges to be shifted-up, in the engine-braking stage (S500), the engine braking action is sequentially and repeatedly performed on the plurality of engine cylinders such that a reduction in rpm required for the shifting of gears is obtained, thereby reducing the rpm of an engine to a required level.

After the engine-braking stage (S500), when the rpm is reduced to a predefined value or less, a shift-stage (S700) is performed, and the control method is terminated.

Further, after the shift action in the shift stage, there is no need to further reduce the rpm of an engine, so an engine-brake release stage (S900) is performed with the action that the TCU controls the ECU to release the engine braking action.

Figure 2:
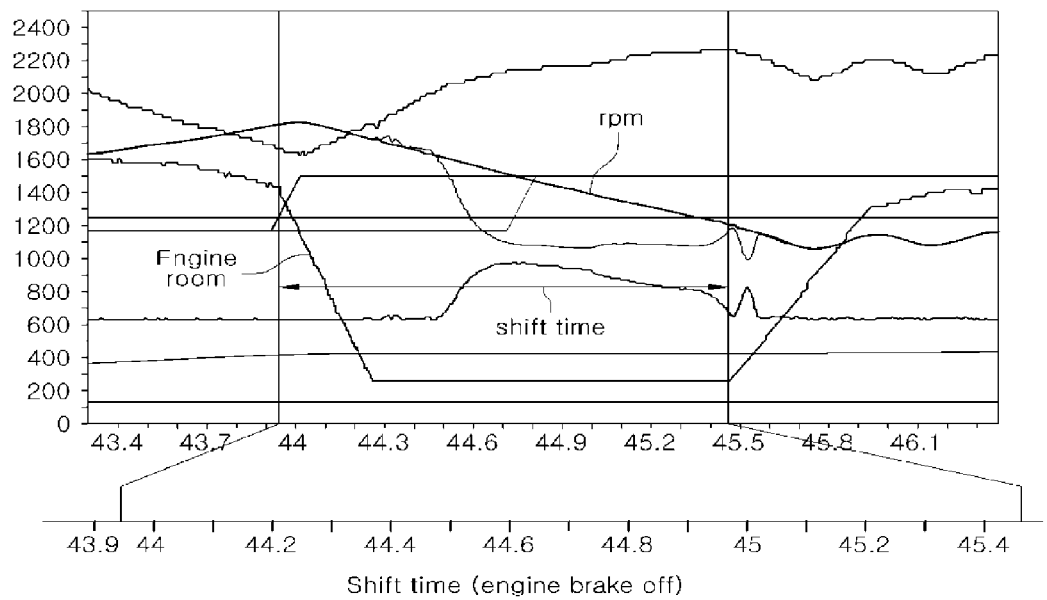
FIGS. 2 and 3 show test results of the exemplary control method for a transmission in a vehicle according to various embodiments of the present invention.
Figure 3:
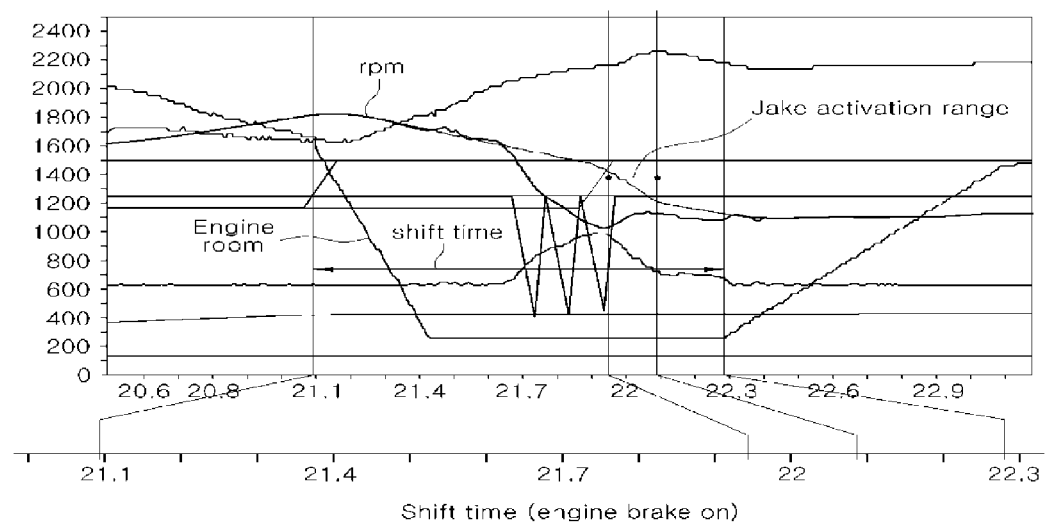

Test results on the control method for a transmission in a vehicle according to various embodiments of the present invention were shown in FIGS. 2 and 3.

According to the FIGS. 2 and 3, during the shift from 5 range to 7 range, if the engine brake is not employed, 1.5 seconds are required, whereas if the engine brake is employed, only 1.2 seconds is required, showing an improvement of about 21%.

Figure 4:
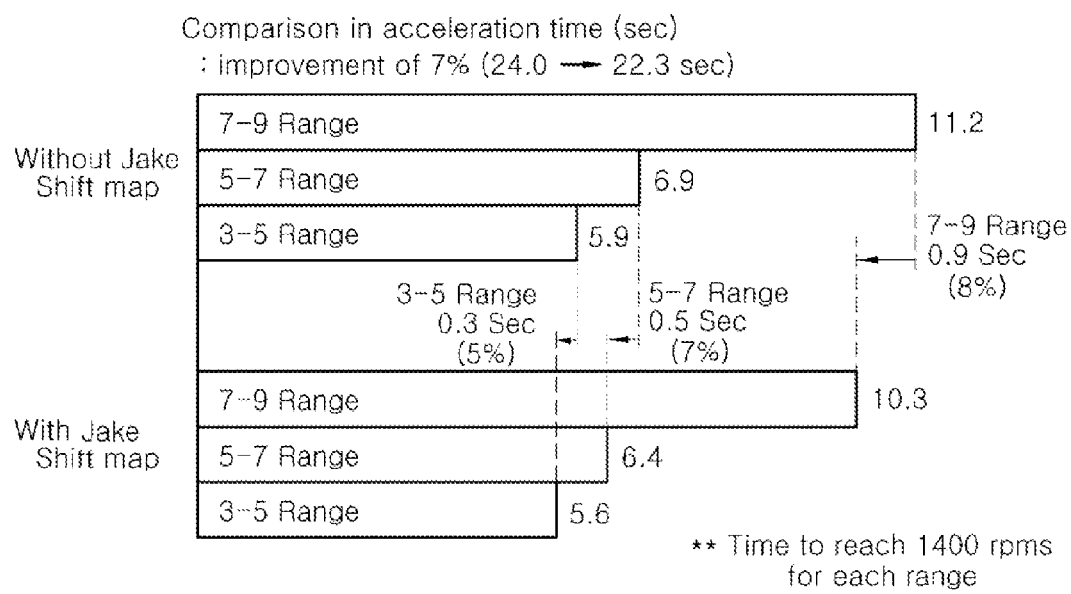
FIG. 4 shows a comparison in acceleration times of the exemplary control method for a transmission in a vehicle according to various embodiments of the present invention

Further, with regard to acceleration time, if the engine brake is not employed, 24 seconds are required, whereas if the engine brake is employed, 22.3 seconds are required, showing an improvement of about 7%. These results were shown in FIG. 4.

Thus, according to the control method for a transmission in a vehicle, when shifting of gears is carried out, a reduction in rpm of an engine is obtained faster than in the related art without using separate parts, shortening the time from the start to reach top speed, thereby improving accelerating performance that a driver can feel and thus increasing a performance quality of a transmission.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for a transmission in a vehicle, the method comprises:
   a shift-determination stage performed by a transmission control unit (TCU), the shift-determination stage including receiving the rpm of an engine from an rpm sensor and determining whether to perform shifting of gears depending on the received rpm;
   wherein while the shifting of gears is determined in the shift-determination stage, an ECU-control stage allowing the TCU to control an engine control unit (ECU) to cut off fuel supplied to a combustion chamber by controlling a fuel injector and to release a clutch connecting an engine and a transmission;
   wherein after the control action in the ECU-control stage, an engine-braking stage monitoring a change in pressure of engine cylinders and allowing engine braking action to be activated by controlling an exhaust valve to be opened; and wherein while the rpm is reduced to a predefined value or less after the engine-braking stage, a shift-stage performing a shift action.

2. The control method according to claim 1, wherein the rpm sensor is provided in the transmission.

3. The control method according to claim 1, wherein the shift-determination stage comprises comparing the rpm received from the rpm sensor with a reference rpm at the shifting of gears which is stored in the TCU, and, when the received rpm is equal to or higher than the reference rpm, performing the shift action in a subsequent stage.

4. The control method according to claim 1, wherein the engine-braking stage comprises monitoring the change in pressure in the engine cylinders and activating the engine braking action on the engine cylinder that changes in pressure during a compression stroke.

5. The control method according to claim 1, wherein the engine braking action is sequentially and repeatedly performed on the plurality of engine cylinders such that a reduction in rpm required for the shifting of gears is obtained.

6. The control method according to claim 1, further comprising an engine-brake release stage of, after the shifting action in the shift stage, in the TCU, controlling the ECU to release the engine braking action.

* * * * *